United States Patent [19]

Blum

[11] Patent Number: 4,728,230
[45] Date of Patent: Mar. 1, 1988

[54] MULTISPINDLE-DRILLING MACHINE

[75] Inventor: Dietmar Blum, Höchst, Austria

[73] Assignee: Julius Blum Gesellschaft m.b.H., Höchst, Austria

[21] Appl. No.: 941,623

[22] Filed: Dec. 11, 1986

[30] Foreign Application Priority Data

Dec. 24, 1985 [DE] Fed. Rep. of Germany ....... 8536432

[51] Int. Cl.⁴ ............................................... B23B 39/18
[52] U.S. Cl. .......................................... 408/53; 408/79; 408/110
[58] Field of Search ................ 408/51, 50, 52, 42, 408/116, 115 R, 110, 112, 114, 75, 95, 97, 98, 72, 53, 79; 269/87.3, 190, 193, 194

[56] References Cited

U.S. PATENT DOCUMENTS

| 171,546 | 12/1875 | Boe | 408/79 |
| 1,521,158 | 12/1924 | King | 408/42 |
| 2,592,432 | 4/1952 | Kline et al. | 408/79 |
| 4,090,803 | 5/1978 | Haley | 408/42 |

FOREIGN PATENT DOCUMENTS

| 1575902 | 10/1980 | United Kingdom | 408/42 |
| 0906648 | 2/1982 | U.S.S.R. | 408/79 |
| 914196 | 3/1982 | U.S.S.R. | 408/42 |

Primary Examiner—Z. R. Bilinsky
Attorney, Agent, or Firm—Wenderoth, Lind & Ponack

[57] ABSTRACT

A multispindle-drilling machine for drilling series of holes, in particular in parts of pieces of furniture, includes a drilling head, carrying drilling spindles. Two positioning pins are mounted on the head for displacement relative thereto in directions axially of the pins. The pins are fixable at upper and lower positions relative to the head. The pins are displaced relative to the head and are held by automatic catches upon completion of a drilling operation.

14 Claims, 6 Drawing Figures

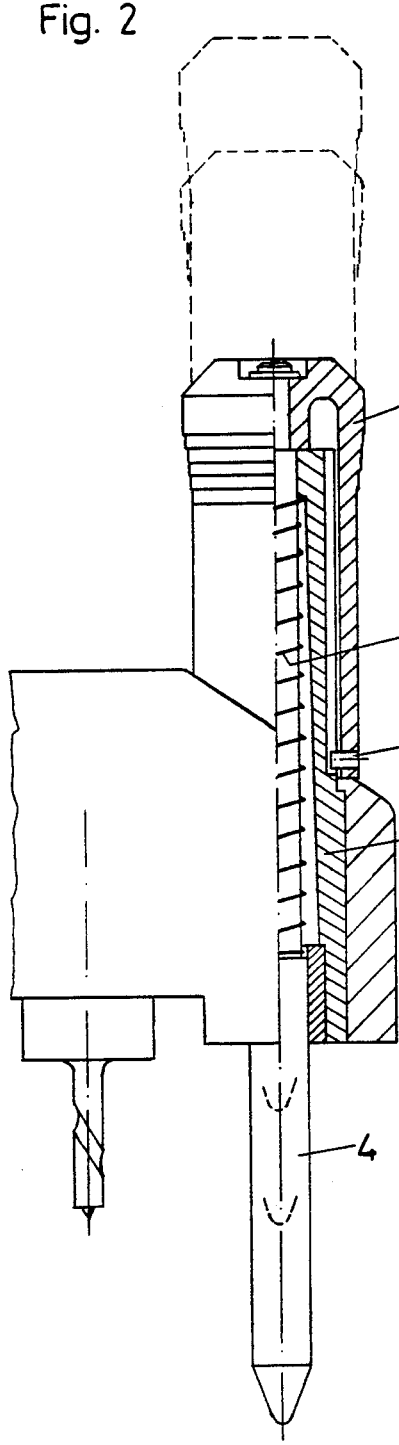
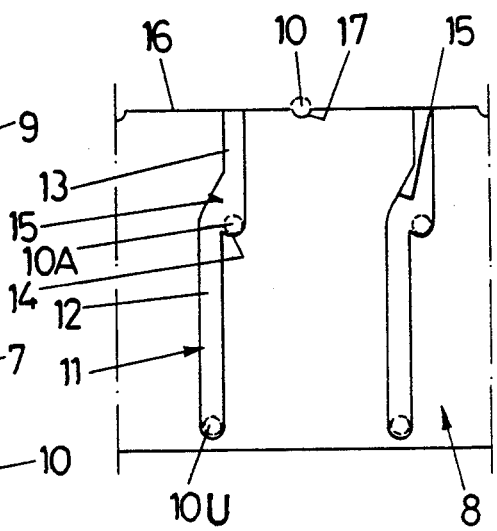

MULTISPINDLE-DRILLING MACHINE

FIELD AND BACKGROUND OF THE INVENTION

The invention relates to a multispindle-drilling machine for drilling series of holes, in particular in parts of pieces of furniture, and including a drilling head, feed means and driving means for drilling spindles, a positioning pin displaceable in the axial direction and fixable in upper and lower positions and mounted laterally with respect to the drilling head.

Multispindle-drilling machines of the afore-mentioned kind are used in furniture production for drilling series of holes. The standard distance between the individual holes of such series of drilled holes is 32 mm. Drilling machines are known by means of which a complete series of holes can be drilled into a piece of furniture in one operating step. Often the number of drilling spindles of the drilling head is smaller than the number of holes to be drilled into a furniture part, and the distance between the marking points for the holes to be drilled is such that the drilling head must be displaced with respect to the furniture part so that the drilling operation for finishing the desired series of holes can be repeated.

It is essential that the distances between the holes formed by one drilling operation and the holes are formed by the next drilling operation be 32 mm or a precise multiple thereof.

In a known multispindle-drilling machine a postioning pin disposed at a distance of 32 mm from the next drill and aligned in a line with the drills is arranged at each end of the drilling head. In its lower position the positioning pin extends beyond the drills.

Depending on whether the work-piece is moved to the right or to the left, the left or the right positioning pin can be locked in an upper position in which its lower end is higher than the points of the drills.

In this machine the positioning pin in operation and engaging the last hole of a previously drilled series of holes must be lifted from such last hole to enable the work-piece, e.g. a chipboard, to be moved for a subsequent drilling operation.

SUMMARY OF THE INVENTION

It is the object of the invention to provide an improved multispindle-drilling machine of the above type wherein when the drilling head is lifted after a drilling operation, the positioning pin is automatically lifted from the hole drilled into the work-piece so that the work-piece can be moved without manually lifting the positioning pin.

According to the invention this is achieved by automatic catch means holding the positioning pin which is displaced relative to the drilling head during the drilling operation.

It is advantageously provided that the catch means holds the positioning pin in a lifted position which lies between lower and upper positions at which the said pin is manually fixable.

An embodiment of the invention provides that the positioning pin is provided with rack teeth which mesh with a pinion which is lockable in at least one position by means of a spring. The pinion may be connected to a cylinder with a cam surface against which the spring engages.

The cylinder is advantageously designed as a turning handle.

A further embodiment of the invention provides that the positioning pin is surrounded by a guide sleeve which includes a guide path in the form of a groove into which extends a guide pin which is connected with the positioning pin.

It is advantageously provided that the guide path comprises a lower portion and an upper portion which are staggered with respect to each other substantially by the width of the guide path.

A further embodiment provides that the guide path is open towards the upper rim of the guide sleeve.

In the latter-mentioned arrangement the guide pin can be moved out of the guide sleeve and abut at the rim thereof. Thus the positioning pin is held in its top position.

BRIEF DESCRIPTION OF THE DRAWINGS

Two embodiments of the invention will now be described in more detail with reference to the accompanying drawings, in which:

FIG. 2 is a side view, parts thereof in section, of a first embodiment of a holding means of a positioning pin thereof, FIG. 3 is a diagrammatic view of a guide sleeve thereof.

Figure 1:
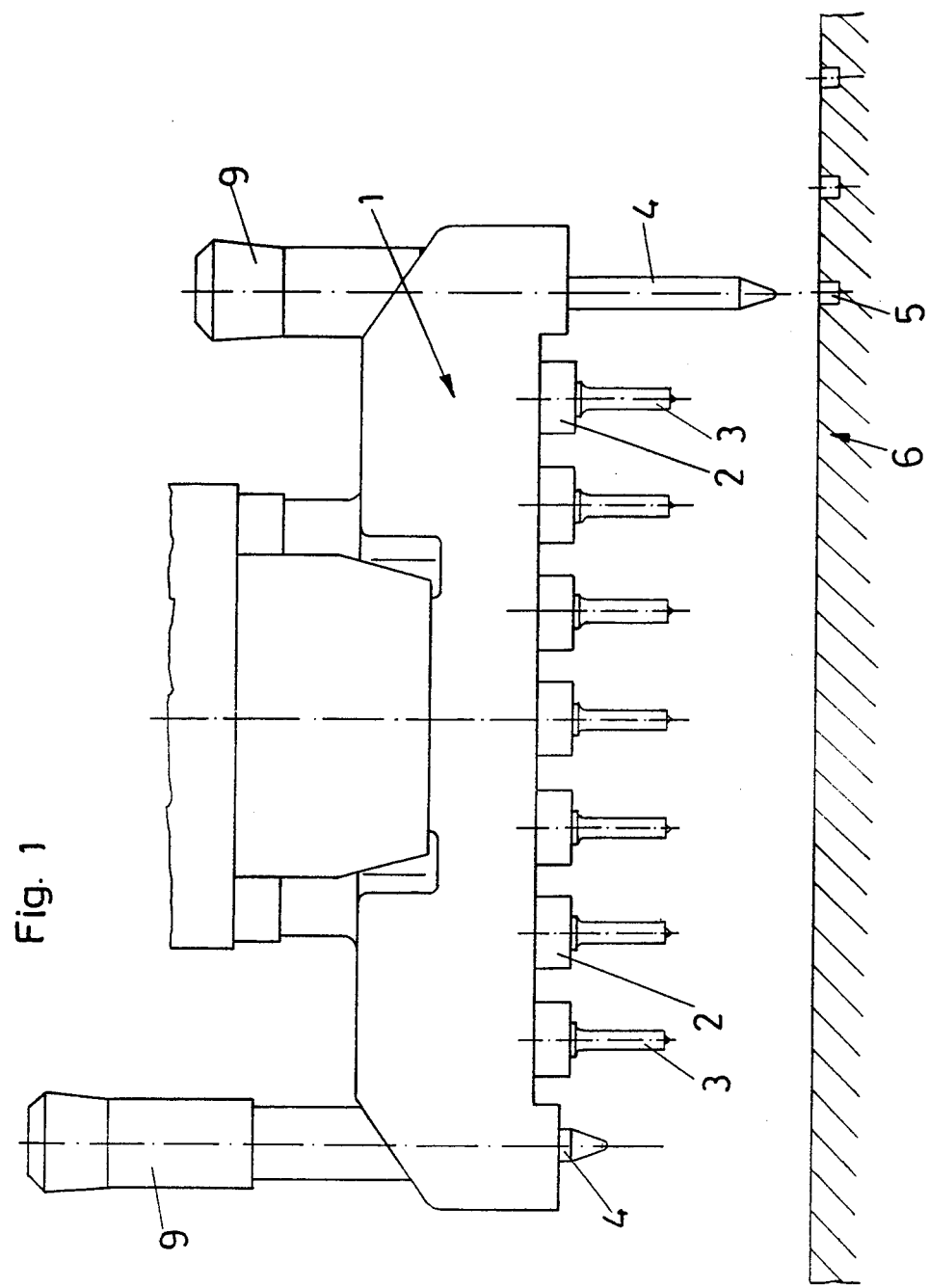
FIG. 1 is a side view of a multispindle-drilling machine.

The parts of the drilling machine which are not directly related to the drilling machine, such as the supporting table, ruler, machine support and driving motor, are not shown in the drawings for the sake of clarity.

DESCRIPTION OF THE PREFERRED EMBODIMENTS

FIG. 1 shows a drilling head 1 which carries a row of drilling spindles 2 for drills 3. At both ends of the row of drilling spindles are provided positioning pins 4. During an operation of drilling a row of holes 5 into a work-piece 6, a positioning pin 4 extends into the nearest hole 5 of the row of holes 5 drilled previously to thereby secure the distance between holes 5 which has to be observed, e.g. a distance between holes of 32 mm.

The second positioning pin 4 is maintained in an upper position during this operation.

In the embodiment according to FIGS. 2 and 3 each positioning pin 4 is urged downwardly by a coil spring 7 and is surrounded by a guiding sleeve 8. At the upper end the positioning pin 4 is connected with a sleeve 9 into which extends a guide pin 10.

The guide sleeve 8 has a guide groove 11 in the form of a groove. The guide groove 11 comprises a lower portion 12 and an upper portion 13 which are staggered or stepped with respect to each other by approximately the breadth or width of the guide groove 11. By this arrangement there is formed at the step between portions 12, 13 a catch 14 at a position opposite an inclined guide wall or camming surface 15 between portions 12, 13. The guide groove 11 is open towards an upper rim 16 of the sleeve 8. Several guide grooves 11 may be provided in the guide sleeve 8.

If the positioning pin 4 is to be brought into its top or retracted position, the sleeve 9, which forms a handle, lifted and the guide pin 10 is pulled upwardly out of the guide groove 11.

By turning the handle the guide pin 10 is held at the upper rim 16 of the sleeve, and a catching recess or notch 17 may be provided in the rim 16 as shown in FIG. 3.

The positioning pin 4 which is to be inserted into the drilled hole 5 is in its lowermost or projected position at the start of the drilling operation, i.e. the guide pin 10 is in the guide path in the position marked by 10U in FIG. 3.

During drilling, head 1 and sleeve 8 including groove 11 move downwardly relative to pins 4, 10 until pin 10 is cammed by surface 15 into catch 14. Movement of head 1 is toward the workpiece from a withdrawn position to a maximum driilling depth position.

The positioning pin 4 is therefore automatically fixed at a middle position 10A and will automatically be moved out of the hole 5 upon subsequent movement upwardly of head 1 and sleeve 8.

Figure 4:
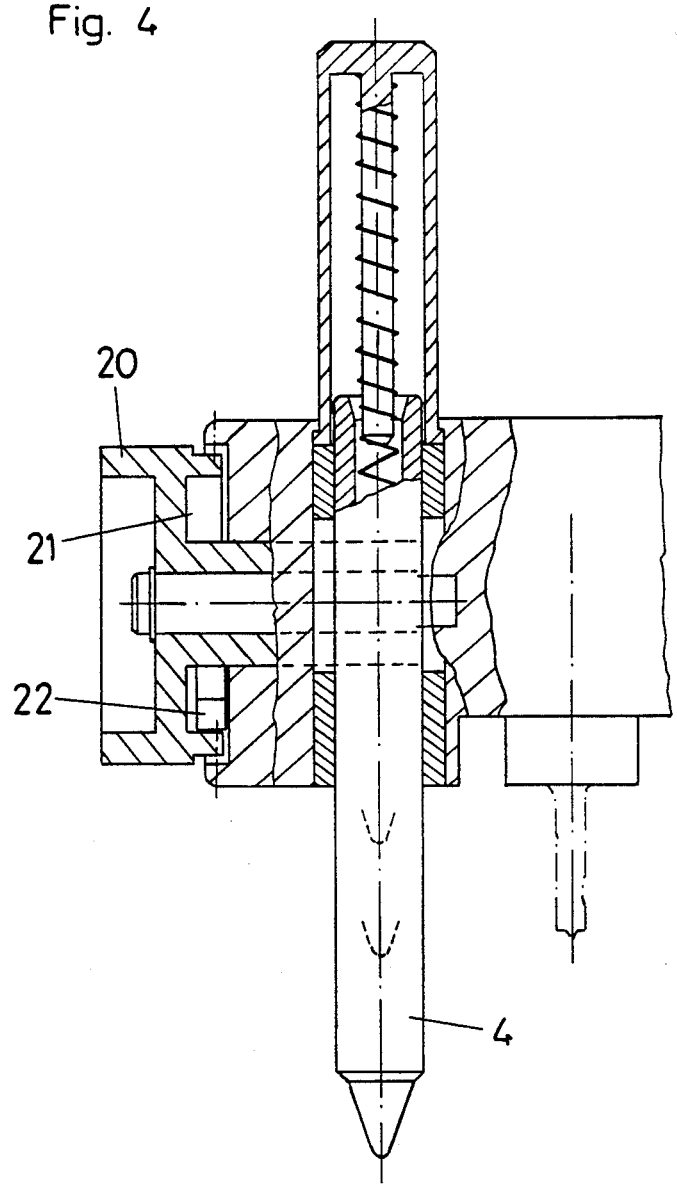
FIG. 4 is a vertical sectional view of a second embodiment of the holding means of the positioning pin.
Figure 5:
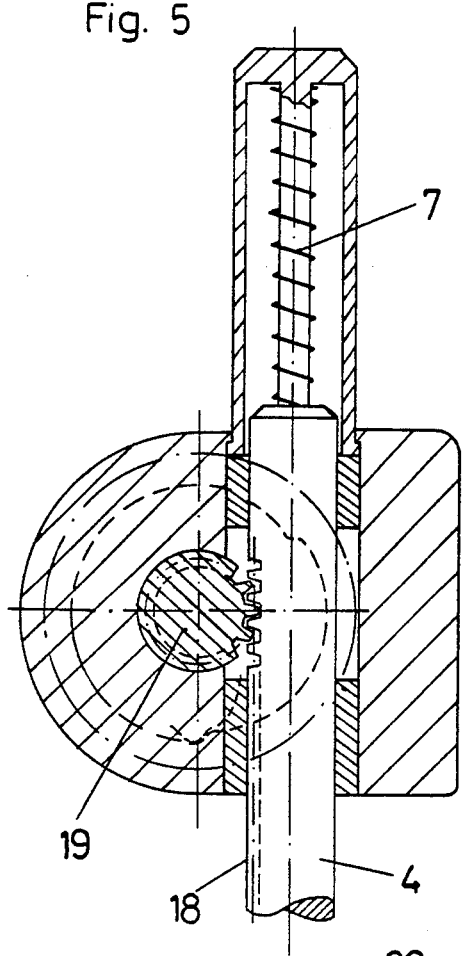
FIG. 5 is a sectional view through the arrangement of FIG. 4.
Figure 6:
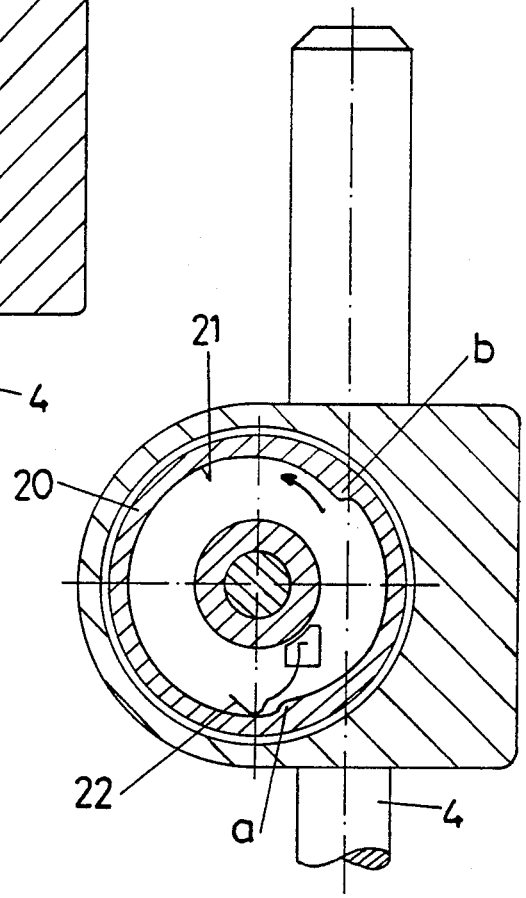
FIG. 6 is a further sectional view through the arrangement of FIG. 4.

In the embodiment according to FIGS. 4 to 6 the positioning pin 4 is provided with rack teeth 18 that mesh with a pinion 19.

The pinion 19 is connected with a cylinder 20 which is designed as a turning handle.

As can be seen from FIGS. 4 and 6, the cylinder 20 has an internal cam surface 21 against which presses a spring 22, which is a leaf spring in the illustrated embodiment.

Two cams a, b are arranged along the cam surface 21.

In the position illustrated in FIG. 6, the positioning pin is in the lowermost position, i.e. in the position in which it extends into the drilled hole 5.

During the drilling operation the drill head and pinion 19 are moved downwardly relative to positioning pin 4 As a result pinon 19 and cylinder 20 are rotated.

Rotation of the cylinder 20 in the direction of the arrow causes the spring 22 to ride over and engage cam b. The positioning pin 4 is thus held in a center position, i.e. in a position which corresponds in the aforedescribed embodiment to position 10A of the positioning pin 4. Upon subsequent upward movement of the drill head, pin 4 automatically will be withdrawn from the hole 5 due to spring 22 engaging cam b and preventing rotation of cylinder 20 opposite to the arrow.

The positioning pin 4 is brought into its top position by turning the cylinder 20 in the direction of the arrow until the spring 22 engages at cam a.

What is claimed is:

1. In a multispindle drilling machine for drilling series of holes in a workpiece, particularly a furniture part, said machine including a drilling head having drilling spindles, feed means for moving said drilling head toward and away from the workpiece between a maximum drilling depth position and a withdrawn position, and at least one positioning pin mounted on said drilling head, said drilling head being slidable relative to said positioning pin in opposite directions between a projected position of said positioning pin, whereat an end of said positioning pin extends beyond drills supported by said drilling spindles such that said end may be positioned in a hole previously drilled in the workpiece, and a retracted position of said positioning pin, whereat said end of said positioning pin is spaced further from the workpiece than are the drills, whereby during a drilling operation said drilling head moved relative to the workpiece from said withdrawn position to said maximum drilling depth position and thereby relative to said positioning pin from said projected position of positioning pin to a middle position of said positioning pin intermediate said projected and retracted positions, the improvement comprising:

means for, upon completion of the drilling operation, retaining said positioning pin in said middle position relative to said drilling head, and thereby for, upon operation of said feeding means to move said drilling head from said maximum drilling depth position to said withdrawn position, automatically removing said end of said positioning pin from the previously drilled hole.

2. The improvement claimed in claim 1, further comprising a guide sleeve fixed to said drilling head and surrounding said positioning pin, such that said positioning pin is axially slidable relative to said guide sleeve between said projected, middle and retracted positions, and wherein said retaining means comprises a guide groove formed in said guide sleeve and a guide pin connected to said positioning pin and extending into said guide groove for sliding movement therein while being guided thereby.

3. The improvement claimed in claim 2, wherein said guide groove includes first and second portions connected to each other and staggered with respect to each other.

4. The improvement claimed in claim 3, wherein said first and second portions are staggered by a distance substantially equal to the width of said guide groove.

5. The improvement claimed in claim 3, wherein said first portion of said guide groove includes a closed first end defining said projected position and a second end connected to said second portion of said guide groove.

6. The improvement claimed in claim 3, wherein said second groove includes an open first end opening onto a rim of said guide sleeve and a second end connected to said first portion of said guide groove.

7. The improvement claimed in claim 6, wherein said rim of said guide sleeve has therein a recess for receipt of said guide pin and thereby defining said retracted position.

8. The improvement claimed in claim 3, wherein said guide groove includes a catch between said first and second portions for receipt of said guide pin and thereby defining said middle position, and an inclined cam surface between said first and second portions for caming said guide pin from said first portion to said catch.

9. The improvement claimed in claim 2, further comprising a further sleeve connected to said positioning pin for movement therewith relative to said guide sleeve, said guide pin being fixed to said further sleeve, and said further sleeve forming a manually graspable handle.

10. The improvement claimed in claim 1, wherein said retaining means comprises rack teeth formed on said positioning pin, a pinion rotatably connected to said drilling head and movable therewith between said withdrawn and maximum drilling depth positions, said pinion meshing with said rack teeth and being rotatable with respect to said drilling head upon relative sliding movement between said positioning pin and said drilling head, and spring means connected to said drilling head and operatively associated with said pinion for preventing rotation thereof in a first direction when said positioning pin reaches said middle position.

11. The improvement claimed in claim 10, further comprising a cylindrical member fixed to said pinion and rotatable therewith relative to said drilling head, said cylindrical member having a cam surface including at least one catch cam, said spring means riding on said cam surface such that said cylindrical member and said pinion are fully rotatable with respect to said spring in a second direction opposite to said first direction, but rotation in said first direction is stopped by said spring means engaging said one catch cam when said positioning pin reaches said middle position during a drilling operation.

12. The improvement claimed in claim 11, wherein said cam surface includes another catch cam engaged by said spring means when said positioning pin is at said retracted position.

13. The improvement claimed in claim 11, wherein said cam surface is formed on an inner wall of said cylindrical member.

14. The improvement claimed in claim 11, wherein said cylindrical member has a manually graspable outer surface enabling an operator to rotate said cylindrical member and said pinion and thereby cause said positioning pin to slide relative to said drilling head.

* * * * *